US008309203B2

(12) United States Patent
Catalfamo

(10) Patent No.: US 8,309,203 B2
(45) Date of Patent: Nov. 13, 2012

(54) WATER-SOLUBLE SUBSTRATE WITH RESISTANCE TO DISSOLUTION PRIOR TO BEING IMMERSED IN WATER

(75) Inventor: Vincenzo Catalfamo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1184 days.

(21) Appl. No.: 11/824,700

(22) Filed: Jul. 2, 2007

(65) Prior Publication Data

US 2008/0008859 A1 Jan. 10, 2008

Related U.S. Application Data

(60) Provisional application No. 60/818,693, filed on Jul. 5, 2006.

(51) Int. Cl.
*B32B 3/00* (2006.01)
*B29B 13/00* (2006.01)

(52) U.S. Cl. ........ 428/143; 428/141; 428/147; 264/271; 427/147; 427/195; 427/201; 427/307

(58) Field of Classification Search .................. 428/141, 428/143, 147; 264/271; 427/147, 195, 201, 427/307
See application file for complete search history.

(56) References Cited

U.S. PATENT DOCUMENTS 4,416,791 A * 11/1983 Haq .............................. 510/296
4,725,465 A 2/1988 Lastovich
4,748,069 A 5/1988 Cullen
5,296,282 A 3/1994 Evers
5,389,425 A 2/1995 Platt et al.
6,509,072 B2 1/2003 Bening et al.
7,229,955 B2 6/2007 Dasque et al.
2002/0164443 A1* 11/2002 Oles et al. .................... 428/35.7
2008/0008906 A1 1/2008 Catalfamo
2008/0009585 A1 1/2008 Catalfamo
2008/0041751 A1 2/2008 Catalfamo

FOREIGN PATENT DOCUMENTS

EP 0 079 248 A2 5/1983
EP 0 479 404 A2 4/1992
JP 2001-162708 A * 4/2000
JP 2001-162708 * 6/2001
WO WO 2005/056391 A2 6/2005

OTHER PUBLICATIONS

Machine Translation of Meiwa et al. JP 2001-162708 (Apr. 2000).*
PCT International Search Report, Mailed Mar. 5, 2008, 4 Pages.

* cited by examiner

*Primary Examiner* — Gerard Higgins
*Assistant Examiner* — Sathavaram I Reddy
(74) *Attorney, Agent, or Firm* — Tiffany M. Zerby

(57) ABSTRACT

A water-soluble substrate, and more particularly a water-soluble substrate that is resistant to dissolution, and methods of making the same are disclosed. The water-soluble substrate has a first and second surface. Water-insoluble particles are applied to and partially embedded in at least one of said first and second surfaces, thereby forming protruberances on said first and/or second surface. The protruberances have an average height of from 10 nanometer to 100 micrometer, and the average distance between adjacent peaks of said protruberances is from 10 nanometer to 200 micrometer. Articles, such as pouches, made from the water-soluble substrate, are also disclosed herein.

7 Claims, 2 Drawing Sheets

WATER-SOLUBLE SUBSTRATE WITH RESISTANCE TO DISSOLUTION PRIOR TO BEING IMMERSED IN WATER

CROSS REFERENCE TO RELATED APPLICATION

This application claims the benefit of U.S. Provisional Application Ser. No. 60/818,693, filed Jul. 5, 2006, the disclosure of which is incorporated by reference.

FIELD OF THE INVENTION

This invention relates to a water-soluble substrate, and more particularly a water-soluble substrate which has improved resistance to dissolution prior to being immersed in water, and methods of making the same. This invention also relates to articles, such as pouches, made from the water-soluble substrate.

BACKGROUND OF THE INVENTION

Water-soluble substrates are gaining wider acceptance for use as packaging materials. Packaging materials include films, sheets, blown or molded hollow bodies (i.e. sachets, pouches, and tablets), bottles, receptacles and the like. Often, water-soluble substrates, when used in the preparation of certain types of these articles such as sachets and pouches, leak and/or become sticky when exposed to small amounts of water or high humidity. This can make them unsuitable for usage in the packaging and storage of the compositions contained therein.

The most common consumer complaint for water-soluble pouches is linked to unwanted pouch dissolution when accidentally exposed to small amounts of water, such as when water gets inside the outer packaging in which the pouches are sold and stored after purchase, from wet hands, high humidity, leaking sinks or pipes during storage. This may cause the water-soluble pouches to leak prior to use and/or stick together. The second most frequent complaint is that of the water-soluble pouch failing to fully dissolve upon use. Thus, there remains an unmet need for water-soluble substrates and articles made therefrom, such as sachets and pouches, which have improved resistance to dissolution against exposure to small amounts of water yet can subsequently dissolve very quickly when immersed in an aqueous solution, such as rinse and/or wash water.

Various methods are known in the art to retard the dissolution of water-soluble substrates, typically involving coating the water-soluble substrate with a material which is water-insoluble. For example, U.S. Pat. No. 6,509,072 describes a water-soluble substrate comprising a barrier coating. The barrier coating is a polymeric film which forms a continuous film on the water-soluble substrate.

When these coated water-soluble substrates are processed for use as packaging materials, they are typically being stretched. In certain areas, the substrate may be stretched even up to 200% or more. This could cause the coating to break, and thus allow water to contact the surface of the water-soluble substrate, leading to the above mentioned problems.

It is therefore an objective of the present invention to provide water-soluble substrates which have improved resistance to dissolution prior to being immersed in water, even when these substrates have been stretched and formed into articles such as pouches and sachets, yet can subsequently dissolve very quickly when immersed in an aqueous solution, such as rinse and/or wash water.

SUMMARY OF THE INVENTION

The present invention relates to water-soluble substrate comprising a first and a second surface opposite to said first surface, and having water-insoluble particles applied to at least one of said first and second surfaces, said water-insoluble particles being partially embedded in said water-soluble substrate and forming protruberances on said first or second surface. Said protruberances have an average height of from 10 nanometer to 100 micrometer, and the average distance between adjacent peaks of said protruberances is from 10 nanometer to 200 micrometer.

The present invention also relates to an articles comprising the water-soluble substrate, and to a method of making the water-soluble substrate.

DETAILED DESCRIPTION OF THE INVENTION

This invention relates to a water-soluble substrate, and more particularly a water-soluble substrate which has improved resistance to dissolution prior to being immersed in water, and methods of making the same. This invention also relates to articles comprising the water-soluble substrate described herein.

Water-Soluble Substrate

Figure 1:
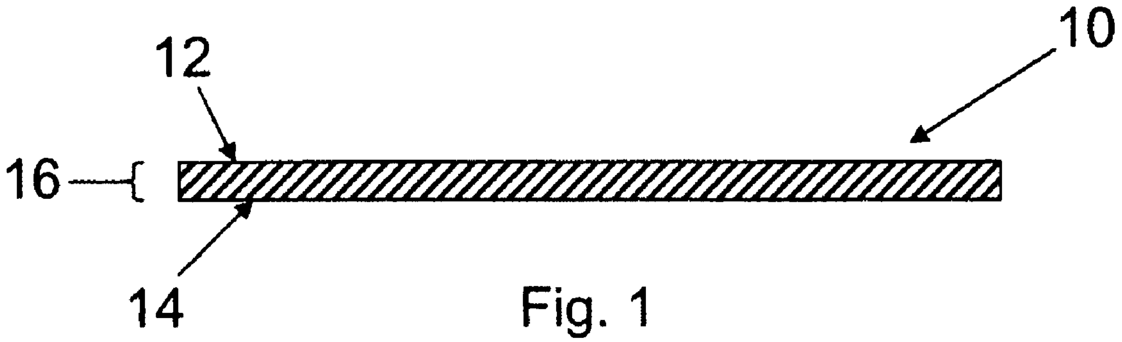
FIG. 1 shows a cross-section of a non-coated water-soluble substrate.

FIG. 1 shows a cross-section of a water-soluble substrate 10. The water-soluble substrate 10 has a first surface 12, a second surface 14 opposite to the first surface 12, and a thickness 16 between the first surface 12 and the second surface 14. The water-soluble substrate 10 can be in the form of a film, a sheet, or a foam, and includes woven and non-woven structures.

The water-soluble substrate is made of polymeric materials and has a water-solubility of at least 50 weight %, as measured by the method set out here after using a glass-filter with a maximum pore size of 20 microns. Preferably the water-solubility of the substrate is at least 75 weight % or even more preferably at least 95 weight %.

50 grams±0.1 gram of substrate material is added in a pre-weighed 400 ml beaker and 245 ml±1 ml of 25° C. distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved fraction). Then, the % solubility can be calculated.

Typically the water-soluble substrate 10 has a basis weight of from 0.33 to 1,667 grams per square meter, preferably from 33 to 167 grams per square meter. The thickness of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer.

Preferred polymers, copolymers or derivatives thereof suitable for use as substrate material are selected from polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof. The most preferred polymer is polyvinyl alcohol. Preferably, the level of polymer in the substrate is at least 60%.

Examples of commercially available water-soluble films are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

Water-Insoluble Particles

Figure 2:
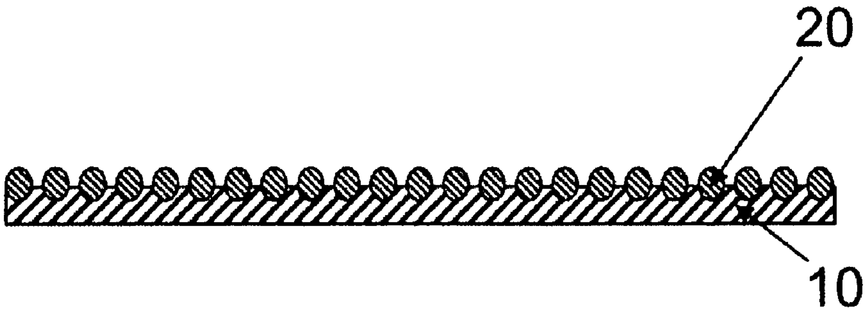
FIGS. 2 and 3 show a cross-section of a water-soluble substrate according to the present invention, having water-insoluble particles applied thereto and which are partially embedded therein.

As shown in FIG. 2, water-insoluble particles 20 are applied to at least one of the first or second surfaces 12, 14, and are partially embedded into the water-soluble substrate 10. By "water-insoluble material", it is meant a material having a solubility of less than 50 weight %, as measured according to the previously described method. Preferably the water-insoluble material has a solubility of less than 40 weight %, more preferably less than 30 weight %, and most preferably less than 10 weight %.

Figure 3:
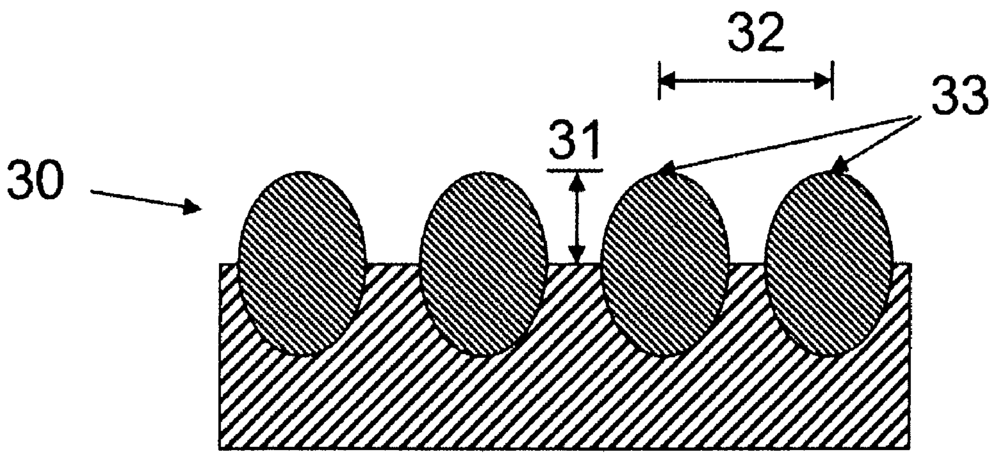

As shown in FIG. 3, the particles 20 are partially embedded into the water-soluble substrate 10, such that they form protruberances 30 on said first and/or second surface. The particles are thus not entirely embedded into the water-soluble substrate. The protruberances have an average height 31 of from 10 nanometer to 100 micrometer, and the average distance 32 between adjacent peaks 33 of said protruberances is from 10 nanometer to 200 micrometer. The particles can be spherical, rounded or can have an irregular form. For convenience, the particles are shown in the Figures as spherical particles. The peak of a protruberance is the single, highest point that can be determined on that protruberance. In the event the highest point is a plateau, the centre of the plateau is considered to be the peak. In the event the protruberance comprises more two or more peaks having the same height, then the point in the middle between those peaks is considered to be the peak. The height of a protruberance is the distance between the peak of the protruberance, and the surface of the water-soluble substrate onto which the protruberance is formed. The peak and the height of a protruberance can be determined by conventional microscopy techniques well known in the art, such as for example scanning electron microscopy ("SEM").

Preferably the average height 31 of the protruberances is from 10 nanometer to 50 micrometer, more preferably from 50 nanometer to 3 micrometer, even more preferably from 100 nanometer to 2 micrometer. The average distance 32 between adjacent peaks 33 of the protruberances is preferably from 10 nanometer to 100 micrometer, more preferably from 100 nanometer to 10 micrometer, even more preferably from 200 nanometer to 2 micrometer.

The fact that the particles 20 are water-insoluble, and the formed protruberances 30 have the above properties, change the morphology of the water-soluble substrate 10 and provide it with unique characteristics, similar to the water-repellent properties of the leafs of the lotus-flower. This is also known in the art as the Lotus®-effect. The protruberances 30 ensure that accidental water-droplets can not reach the surface of the water-soluble substrate, and hence increase its resistance against dissolution. Because the coating of the present invention does not cover the entire surface 12, 14 of the water-soluble substrate 10, it provides the additional benefit of being cheaper than coatings of the prior art since less coating material is used.

The water-insoluble particles 20 are preferably in the nano-size-range, with average particle diameters of from 0.001 to 1 micrometer, preferably from 0.01 to 0.1 micrometer. Coating the water-soluble substrate 10 with nano-sized particles further provides the benefit that the coating becomes transparent, which is aesthetically preferred.

Preferred particles 20 are polymeric particles including particles made of synthetic materials such as polyethylene, polypropylene, polyamide, polyethylene terephthalate, polystyrene, polyurethane and/or its cross-linked product, sodium poly(meth)acrylic acid, poly(meth)acrylic acid ester and/or its cross-linked product, rubber such as ethylene rubber, propylene rubber, styrene-butadiene rubber, butadiene rubber, silicone rubber, etc. and/or its cross-linked products, etc. Other preferred particles are glass beads. Most preferred particles are polyethylene-, polypropylene-, wax-, silicone- or polytetrafluoroethylene-based nanoparticles.

When making articles, such as pouches, comprising the water-soluble substrate 10, the substrate 10 is typically stretched. In certain areas of the substrate 10, the substrate 10 may be elongated even up to 200% or more. With coatings of the prior art, this could cause the coating to break, and thus allow water to contact the surface of the water-soluble substrate. With the coating of the present invention, the substrate may be elongated up to at least 200% without altering its water-repellent properties, and provides an improvement over coatings of the prior art which are prone to break upon stretching.

When the water-soluble substrate according to the present invention is however immersed in water (i.e. in applications for which the substrate is designed to be used and required to dissolve), the coating is not sufficient to resist the water contact and ensures that the substrate dissolves rapidly.

Optional Ingredients

It may be required for certain applications that the dissolution rate (when immersed) of the substrate is increased. Disintegrants may be applied on the surface of the water-soluble substrate 10 opposite to the surface onto which the particles are applied, or they may be applied integrated into the water-soluble substrate 10, or any combination thereof, in order to speed up the dissolution when the water-soluble substrate 10 is immersed in water. Where present, the level of disintegrant is from 0.1 to 30%, preferably from 1 to 15%, by weight of said water-soluble substrate. Any suitable disintegrant known in the art may be used. Preferred disintegrants for use herein include corn/potato starch, methyl cellulose/celluloses, mineral clay powders, croscarmelose (cross-linked cellulose), crospovidine (cross-linked polymer), sodium starch glycolate (cross-linked starch).

The water-soluble substrate-forming composition and the water-soluble substrate 10 formed therefrom can also comprise one or more additive or adjunct ingredients. For example, the water-soluble substrate-forming composition and the water-soluble substrate 10 may contain: plasticizers, lubricants, release agents, fillers, extenders, anti-blocking agents, de-tackifying agents, antifoams, or other functional ingredients. The latter may, in the case of articles containing compositions for washing, include, but are not limited to functional detergent additives to be delivered to the wash water, for example organic polymeric dispersants, or other detergent additives.

Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof. The plasticizer can be incorporated in the water-soluble substrate 10 in any suitable amount including amounts in the range of from about 5% to about 30% by weight, or in the range of from about 12% to about 20% by weight.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble substrate 10 in any suitable amount including amounts in the range of from about 0.01% to about 1% by weight, or in the range of from about 0.1% to about 0.6% by weight.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble substrate 10 in any suitable amount including amounts within the range of from about 0.02% to about 1.5% by weight, or in the range of from about 0.04% to about 0.15% by weight.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble substrate 10 in any suitable amount including amounts in the range of from about 0.1% to about 25% by weight, preferably in the range of from about 1% to about 15% by weight. In the absence of starch, it may be desirable for the filler, extender, antiblocking agent, detackifying agent to be present in a range of from about 1% to about 5% by weight.

Suitable antifoams include, but are not limited to, those based on polydimethylsiloxanes and hydrocarbon blends. The antifoam can be present in the water-soluble substrate 10 in any suitable amount including amounts in the range of from about 0.001% to about 0.5%, preferably in the range of from about 0.01% to about 0.1% by weight.

The water-soluble substrate composition is prepared by mixing the materials and agitating the mixture while raising the temperature from about 70° F. (about 21° C.) to 195° F. (about 90° C.) until solution is complete. The substrate-forming composition may be made into any suitable form (e.g. film or sheets) and may then be subsequently formed into any suitable product (e.g. single- and multiple-compartment pouches, sachets, bags, etc.).

Methods of Making a Water-Soluble Substrate

The method comprises providing a previously formed water-soluble substrate 10 and applying water-insoluble particles 20 to at least one of the surfaces 12, 14 of the previously formed water-soluble substrate 10. The water-insoluble particles 20 can be applied to the previously formed water-soluble substrate 10 in a number of different manners.

In one non-limiting embodiment, the water-insoluble particles 20 are applied via a jet to at least one of the surfaces 12, 14 of the previously formed water-soluble substrate 10 in the form of a powder. Due to the high speed of the jet, the powder is embedded into the substrate. This embodiment may also comprise a step of first wetting at least a portion of at least one of the surfaces 12, 14 of the water-soluble substrate 10 prior to applying the water-insoluble particles 20 to the previously formed water-soluble substrate 10. The wetting of at least one of the surfaces 12, 14 of the water-soluble substrate 10 may be used to at least partially dissolve or solubilize an outer portion of the surface 12, 14 of the substrate 10 (that is, part of the way into the thickness of the substrate). The water-soluble substrate 10 may be at least partially solubilized to any suitable depth in order to partially embed the coating into the substrate. Suitable depths include, but are not limited to: from about 1% to about 40% or about 45%, from about 1% to about 30%, from about 1% to about 20%, from about 1% to about 15%, and alternatively, from about 1% to about 10% of the overall substrate thickness 16. The water-insoluble particles 20 are then applied to the partially dissolved portion of at least one of the surfaces 12, 14 of the substrate 10. This ensures the water-insoluble particles 20 to be embedded into an outer portion of the surface 12, 14 of the substrate 10, and to become a more permanent part of the substrate 10. The wetted surface 12, 14 of the substrate 10 with the water-insoluble particles 20 embedded into the same is then permitted to dry. Such an embodiment of the method may also comprise a step of removing at least some of any loose or excess of less water-soluble material 20 remaining on the surface of the water-soluble substrate 10 after it has dried, such as by wiping or dusting the surface of the substrate 10.

In another non-limiting, but more preferred embodiment of the method, the water-insoluble particles 20 are provided in the form of a solution comprising said particles that is applied onto at least one of the surfaces 12, 14 of the water-soluble substrate 10, and is allowed to dry, or undergoes a drying process. The solution comprises the water-insoluble particles 20 and a carrier (e.g. water) which is capable of wetting, and thus partially dissolving or solubilising at least one of the surfaces 12, 14 of the water-soluble substrate 10 as described above. The solution can be applied on the film by means of any coating process, including spray, knife, rod, kiss, slot, painting, printing and mixtures thereof. Printing is preferred for use herein. Printing is a well established and economic process. Printing is usually done with inks and dyes and used to impart patterns and colours to substrates but in the case of the invention printing is used to deposit the less water-soluble material(s) onto a water-soluble substrate. Any kind of printing method can be used, including rotogravure, lithography, flexography, porous and screen printing, inkjet printing, letterpress, tampography and combinations thereof.

In another non-limiting embodiment of the method, the particles 20 are applied in multiple application steps, including applying a first series of particles according to any of the above methods, followed by applying a second and optionally more series of particles according to the above methods.

Methods of Making a Water-Soluble Pouch

The water-soluble substrate 10 described herein can be formed into articles, including but not limited to those in which the water-soluble substrate 10 is used as a packaging material. Such articles include, but are not limited to water-soluble pouches, sachets, and other containers.

Water-soluble pouches and other such containers that incorporate the water-soluble substrate 10 described herein can be made in any suitable manner known in the art. The water-soluble substrate 10 can be provided with improved resistance to solubility either before or after forming the same into the final product. In either case, in certain embodiments it is desirable when making such articles, that the surface 12, 14 of the substrate 10 onto which the particles are distributed, forms an outer surface of the article.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a substrate. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a substrate is placed in the die and open pouches are formed in these molds, which can then be filled, covered with another layer of substrate, and sealed. In the third process (formation of pouches in molds on the surface of a circular drum), a substrate is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the substrate can initially be molded or formed into the shape of an open pouch using thermoforming, vacuum-forming, or both. Thermoforming involves heating the molds and/or the substrate by applying heat in any known way such as contacting the molds with a heating element, or by blowing hot air or using heating lamps to heat the molds and/or the substrate. In the case of vacuum-forming, vacuum assistance is employed to help drive the substrate into the mold. In other embodiments, the two techniques can be combined to form pouches, for example, the substrate can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or substrate, such as a water-soluble substrate, over and onto the web of open pouches and then sealing the first substrate and second substrate together. The second material or substrate can comprise the water-soluble substrate 10 described herein. It may be desirable for the surface of the second substrate onto which the particles are applied, to be oriented so that it forms an outer surface of the pouch.

In such a process, the first and second substrates are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

Figure 4:
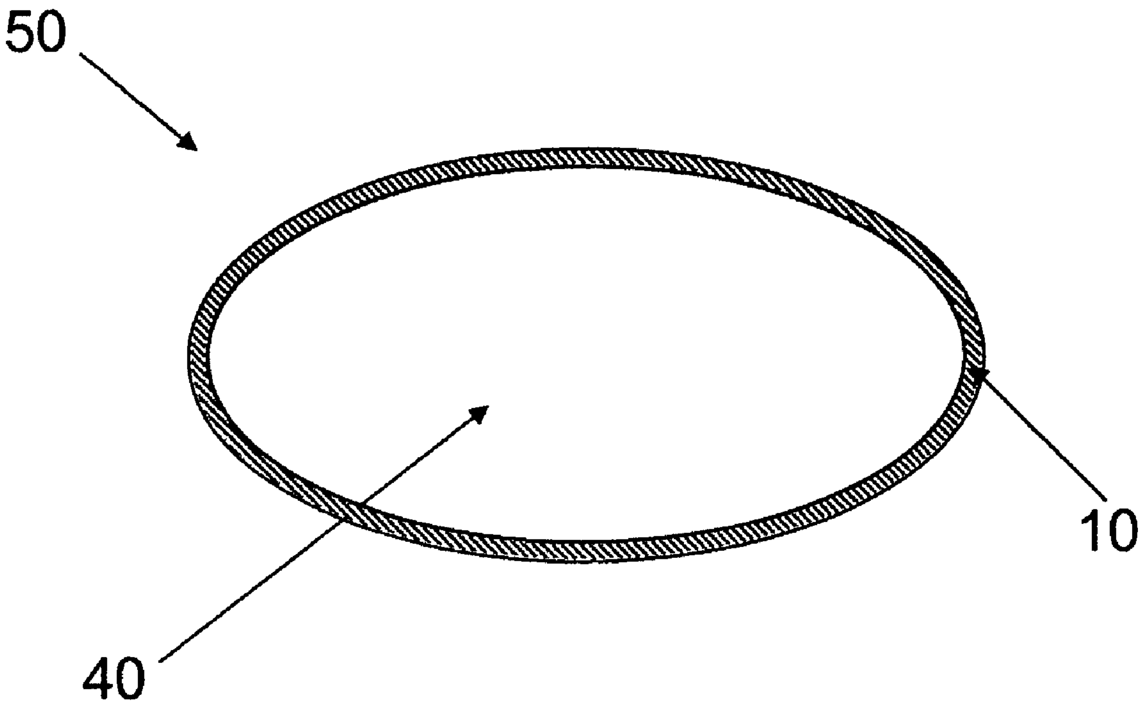
FIG. 4 shows a cross-section of an article comprising the water-soluble substrate according to the present invention.

As shown in FIG. 4, the present invention also includes articles comprising a product composition 40 and a water-soluble substrate 10, which may be formed into a container 50, such as a pouch, a sachet, a capsule, a bag, etc. to hold the product composition. The surface of the water-soluble substrate 10 which has the water-insoluble particles (not shown) applied thereto, may be used to form an outside surface of the container 30. The water-soluble substrate 10 may form at least a portion of a container 30 that provides a unit dose of the product composition 40.

For simplicity, the articles of interest herein will be described in terms of water-soluble pouches, although it should be understood that discussion herein also applies to other types of containers.

The pouches 50 formed by the foregoing methods, can be of any form and shape which is suitable to hold the composition 40 contained therein, until it is desired to release the composition 40 from the water-soluble pouch 50, such as by immersion of the water-soluble pouch 30 in water. The pouches 50 can comprise one compartment, or two or more compartments (that is, the pouches can be multi-compartment pouches). In one embodiment, the water-soluble pouch 50 may have two or more compartments that are in a generally superposed relationship and the pouch 50 comprises upper and lower generally opposing outer walls, skirt-like side walls, forming the sides of the pouch 50, and one or more internal partitioning walls, separating different compartments from one another. If the composition 40 contained in the pouches 50 comprises different forms or components, the different components of the composition 40 may be contained in different compartments of the water-soluble pouch 50 and may be separated from one another by a barrier of water-soluble material.

The pouches or other containers 50 may contain a unit dose of one or more compositions 40 for use as/in laundry detergent compositions, automatic dishwashing detergent compositions, hard surface cleaners, stain removers, fabric enhancers and/or fabric softeners, food and beverage and new product forms where contact with small amounts of water could create premature pouch dissolution, unwanted pouch leakage and/or undesirable pouch-to-pouch stickiness. The composition 40 in the pouches 50 can be in any suitable form including, but not limited to: liquids, liquigels, gels, pastes, creams, solids, granules, powders, etc. The different compartments of multi-compartment pouches 50 may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches 50 may be dropped into any suitable aqueous solution (such as hot or cold water), whereupon water-soluble substrate 10 forming the water-soluble pouches 50 dissolves to release the contents of the pouches.

The water-soluble substrate 10 described herein can also be used for coating products and other articles. Non-limiting examples of such a product are laundry detergent tablets or automatic dishwashing detergent tablets. Other examples include coating products in the food and beverage category where contact with small amounts of water could create premature dissolution, unwanted leakage and/or undesirable stickiness.

EXAMPLES

A nano-sized (approx. 0.1 micron size) PTFE coating, supplied by Shamrock Technologies (Newark, N.J.) under the tradename NanoFlon W50C, is dispersed in water (15% NanoFlon W50C, 85% water) and printed onto a standard 3 mil polyvinyl alcohol-based water-soluble substrate supplied by Monosol. The nano-particles are small enough to not refract the incident light, hence the coated water-soluble substrate has the same appearance than the uncoated water-soluble substrate (completely clear, non-hazy).

Droplet Test Method

To determine if a substrate is resistant to accidental water contact a Droplet Test method has been developed. In this test, a pouch (approx. 2"×2") is formed in a cavity and a droplet of 0.2 ml of room temperature water is added to the formed side of the pouch. The formed side is the stressed case for this test since the film is thinned during cavity formation. A stopwatch is started as soon as the water contacts the pouch and the time when significant film deformation in the body of the pouch is observed, is recorded. This time, termed "Time to Deform" is a precursor to film failure.

Results

| Material | Stretched test Time to Deform |
|---|---|
| Uncoated M8630 standard film supplied by Monosol | Immediate (1 sec) |
| NanoFlon W50C coated on standard M8630 | No deformation |

Importantly, the hydrophobic nano-sized material is coated at extremely low levels (0.2 grams/$m^2$) and it does not affect the overall film solubility (full bath test). Even if at very low levels, due to the nano-sized nature, the exposed surface area is very high.

Full Solubility (Full Bath).

Film is immersed in an agitated 23° C. water bath and the time to completely (visually) dissolve the film is recorded.

Results

| Material | Film Solubility (full bath) |
|---|---|
| Uncoated M8630 film by Monosol, 3 mil thickness | 49 seconds |
| NanoFlon W50C coated on standard M8630 | 52 seconds |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container comprising a water-soluble substrate having a thickness of from about 25 to about 125 micrometer, said substrate comprising a first and a second surface opposite to said first surface, and a thickness between said first and second surfaces, said first surface comprising protruberances comprising partially embedded water-insoluble particles having:

a. an average distance between adjacent peaks of said protruberances from about 200 nanometer to about 2 micrometer; and b. an average diameter of from about 0.001 to about 0.1 micrometer;

wherein said first surface forms an outside surface of said container and said container holds a product composition.

2. A water-soluble substrate according to claim 1 wherein said water-insoluble particles comprise polymeric particles.

3. A water-soluble substrate according to claim 2, wherein said water-insoluble particles are selected from the group consisting of polyethylene-, polypropylene-, wax-, silicone-, poly-tetra-fluoro-ethylene particles and combinations thereof.

4. A method of producing a water-soluble substrate according to claim 1 comprising the step of forming protruberances on said first or second surface by partially embedding water-insoluble particles into said first or second surface.

5. A method according to claim 4, wherein said forming step is applying water insoluble particles in the form of a powder to said at least one of said first or second surfaces via a jet.

6. A method according to claim 5, wherein said method further comprises the step of wetting at least a portion of at least one of the surfaces of the water-soluble substrate prior to applying the water-insoluble particles.

7. A method according to claim 5, wherein said forming step further comprises partially embedding water-insoluble particles provided in the form of a solution comprising said particles and a carrier capable of wetting at least a portion of at least one of the surfaces of the water-soluble substrate.

* * * * *